Figures 1, 1B:
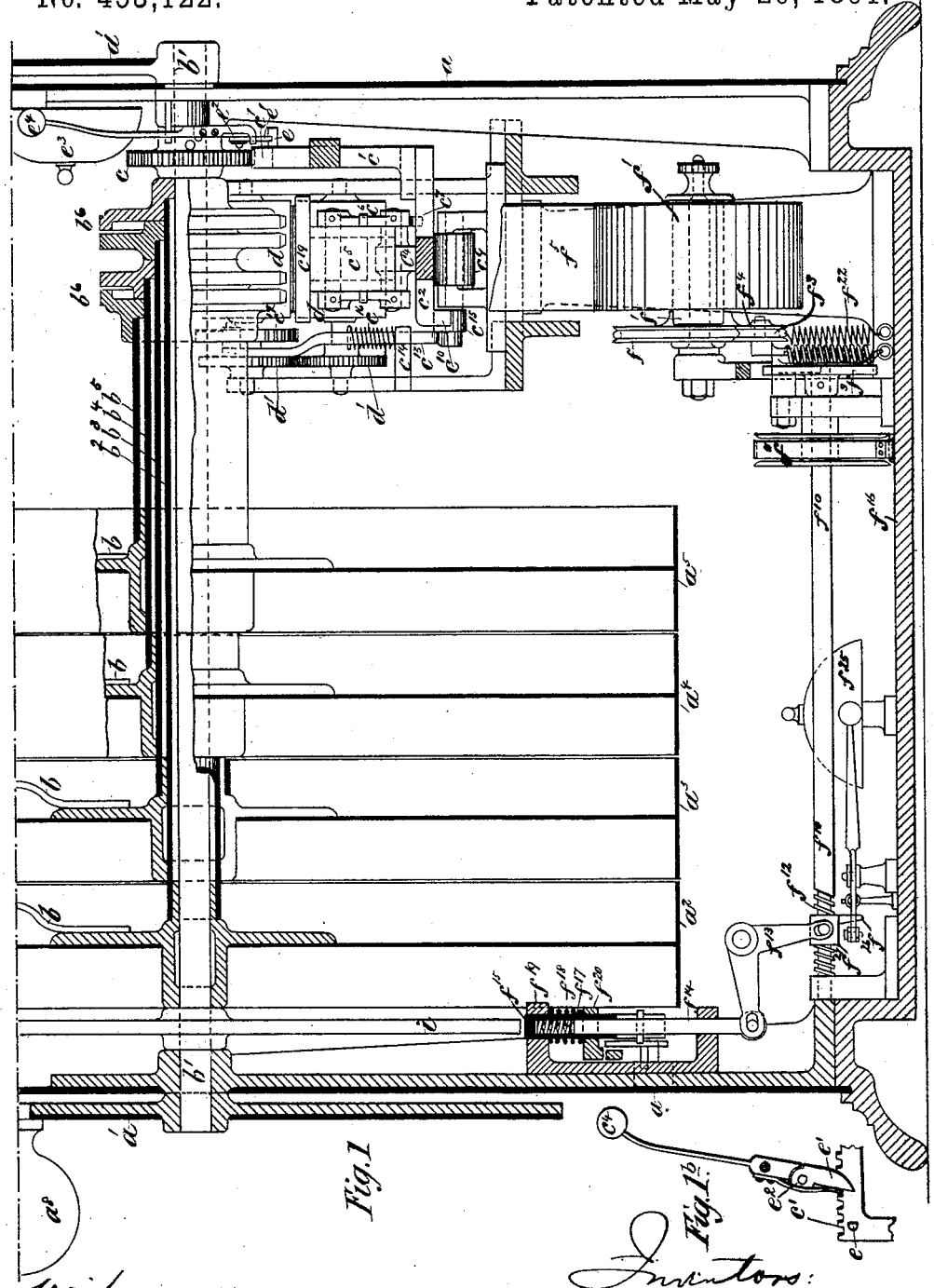

(No Model.) 6 Sheets—Sheet 1.

F. A. MESSER & W. F. THORPE.
CASH INDICATOR AND REGISTER.

No. 453,122. Patented May 26, 1891.

Witnesses:
J. A. Rutherford
Geo. W. Rea

Inventors:
Frederick A. Messer
and Walter F. Thorpe
By James L. Norris
Attorney

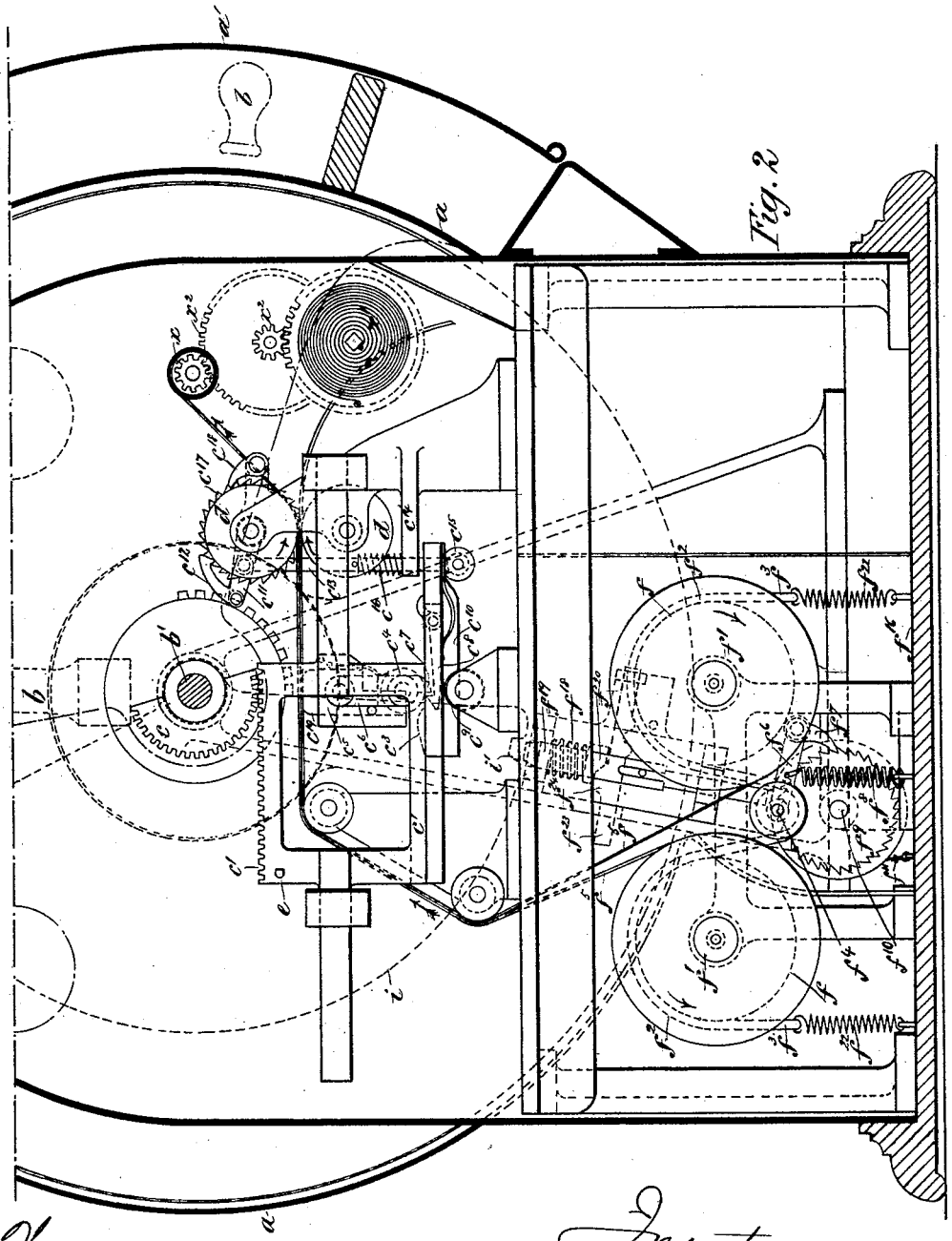

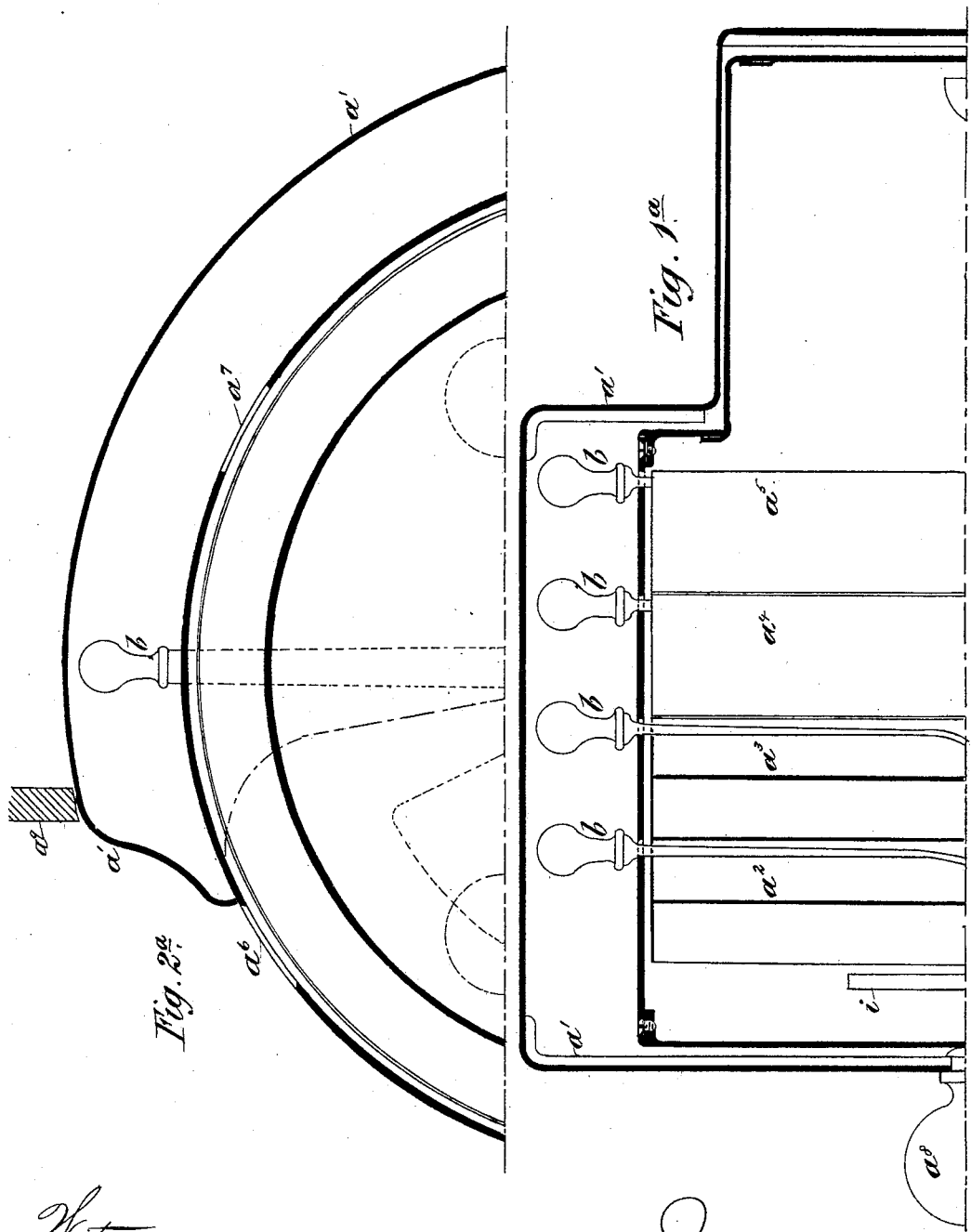

(No Model.) 6 Sheets—Sheet 4.
F. A. MESSER & W. F. THORPE.
CASH INDICATOR AND REGISTER.
No. 453,122. Patented May 26, 1891.
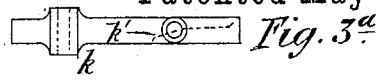
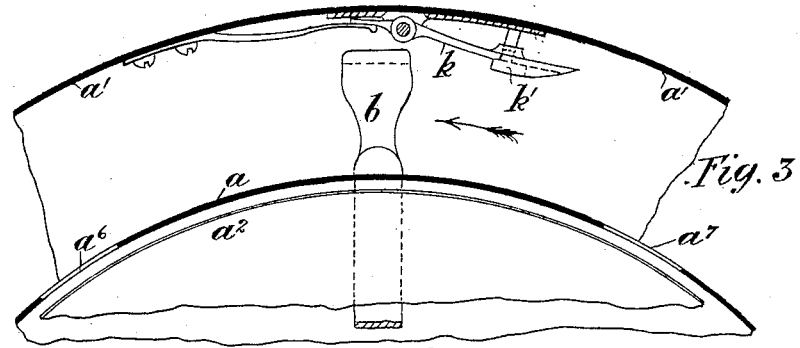
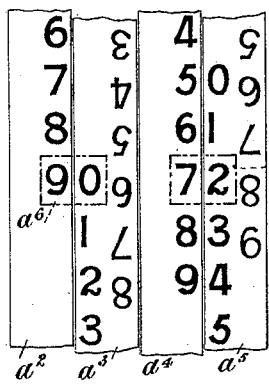
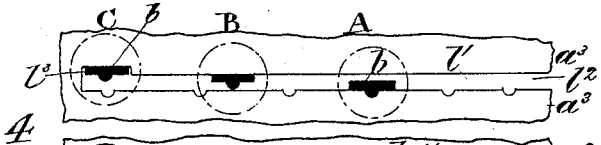
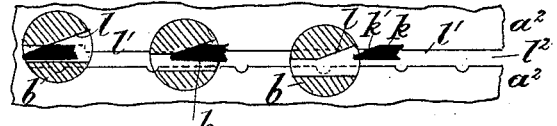
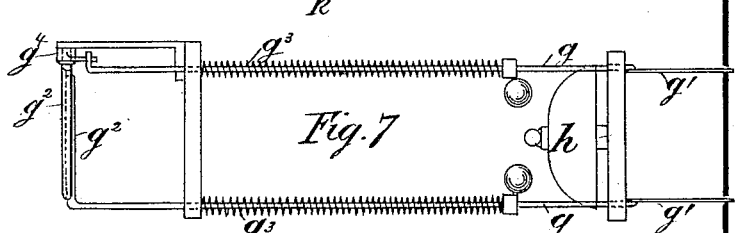
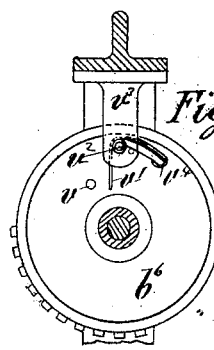
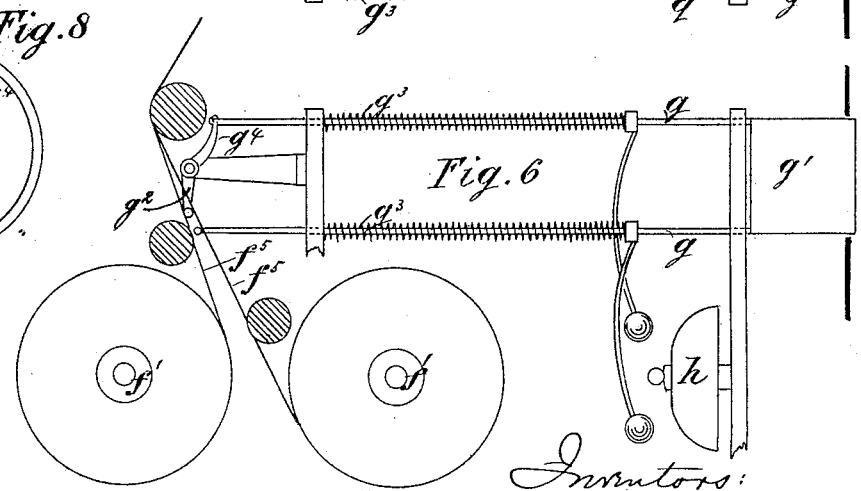
Witnesses:
J. A. Rutherford
Geo. W. Rea
Inventors:
Frederick A. Messer
and Walter F. Thorpe
By James L. Norris
Attorney
THE NORRIS PETERS CO., PHOTO-LITHO., WASHINGTON, D. C.

(No Model.) 6 Sheets—Sheet 5.
F. A. MESSER & W. F. THORPE.
CASH INDICATOR AND REGISTER.
No. 453,122. Patented May 26, 1891.
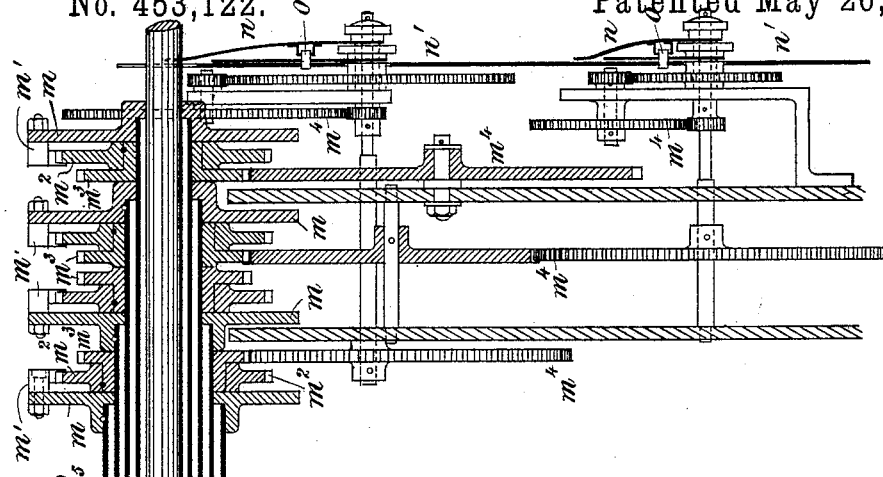
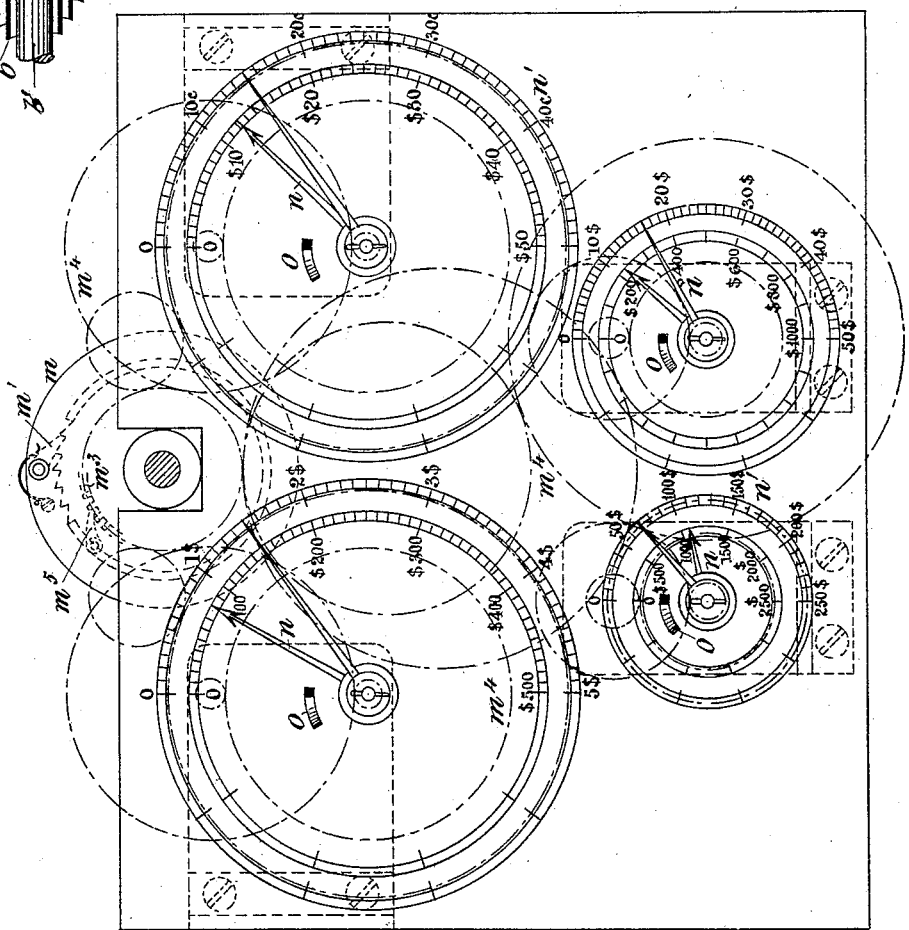
Witnesses:
J. A. Rutherford.
Geo. N. Rea.
Inventors:
Frederick A. Messer and Walter F. Thorpe
By James L. Norris
Attorney
THE NORRIS PETERS CO., PHOTO-LITHO., WASHINGTON, D. C.

(No Model.) 6 Sheets—Sheet 6.
F. A. MESSER & W. F. THORPE.
CASH INDICATOR AND REGISTER.
No. 453,122. Patented May 26, 1891.
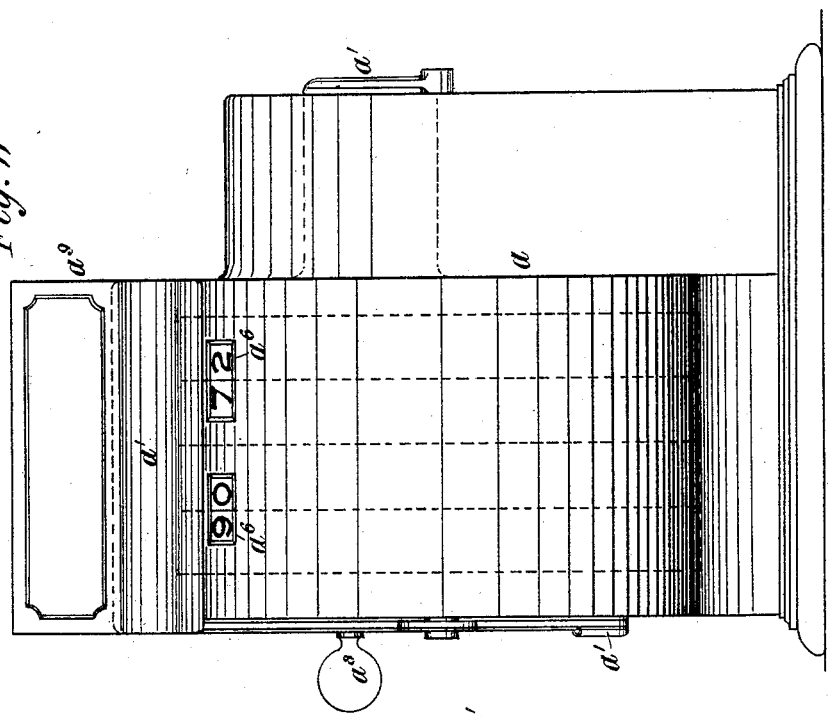
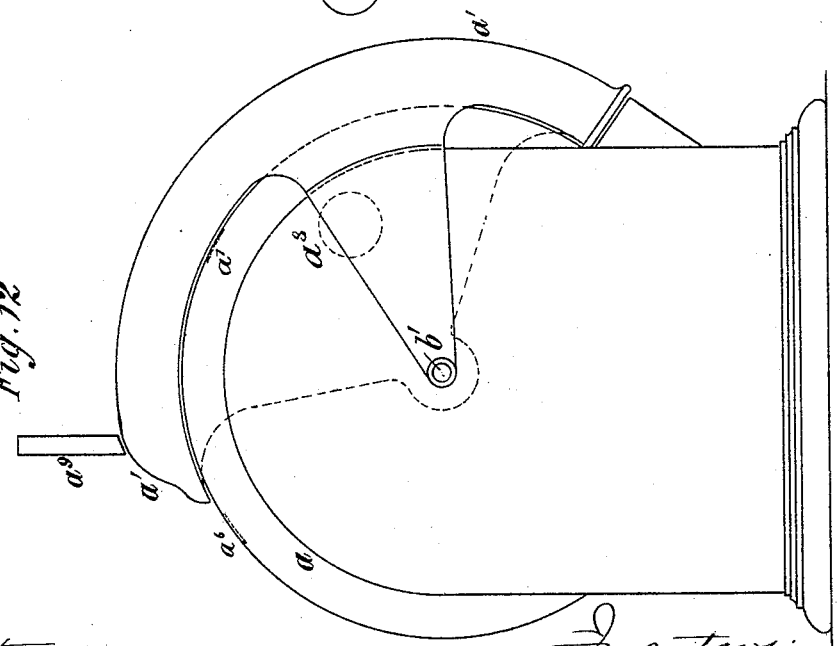

UNITED STATES PATENT OFFICE.

FREDERICK ALFRED MESSER AND WALTER FULLER THORPE, OF LONDON, ENGLAND.

CASH INDICATOR AND REGISTER.

SPECIFICATION forming part of Letters Patent No. 453,122, dated May 26, 1891.

Application filed October 12, 1889. Serial No. 326,816. (No model.) Patented in England April 11, 1888, No. 5,397.

*To all whom it may concern:*

Be it known that we, FREDERICK ALFRED MESSER and WALTER FULLER THORPE, engineers, subjects of the Queen of Great Britain, both residing at 8 Quality Court, Chancery Lane, in the county of Middlesex, England, have invented certain new and useful Improvements in Means and Appliances for Checking and Recording the Payment and Receipt of Money and Analogous Operations, (for which we have obtained a patent in Great Britain, No. 5,397, bearing date April 11, 1888,) of which the following is a specification.

Our invention relates to improved mechanism and arrangements for the same for indicating, checking, and registering the payment and receipt of money and analogous operations.

The indicating portion of our invention is so arranged and the mechanism for actuating the figures belonging to the various denominations is so constructed that any figure or figures forming a sum in the sequence of any one denomination can be so adjusted and placed with regard to the figures of another or other denominations that every combination necessary to form a perfect money sequence within the extremes of the highest and lowest values determined upon can be displayed. By this arrangement the figures representing the amount of any transaction always appear in their natural order and symmetrical position—as, for example, the following figures: $90—72c.

In carrying out our invention we arrange the figures round the periphery of short cylinders or drums, the necessary motion being given to the same by means of levers or equivalent appliances. Further, in combination with the apparatus we record by printing the amount of each transaction upon a ribbon of paper or other suitable material, hereinafter called the "ribbon," or we arrange dials and pointers for respectively registering and totaling under their respective denominations the various amounts of each transaction. We actuate the indicating-drums directly by means of levers, handles, or pulls, which project beyond the periphery of the drums and pass through suitable slots in the casing of the machine inclosing the drums and other mechanism. The casing on one side of these slots has notches or recesses, by the use of which the lever-handles or pulls are retained, and thereby the drums set in any desired position, the lever-handles being constructed to spring toward those sides of the slots which are notched. We sometimes mark the figures of the denomination against the notches belonging to that denomination to give additional guidance to the operator in setting the indicating-drums. The indicating-drums are mounted on the ends of hollow spindles or sleeves, and upon the other ends of the same are mounted or fixed the type-disks, having at their peripheries figures corresponding to those on the indicating-drums and rotating in unison with them, so that the figures of the types presented for printed registration are similar figures (and blank spaces, naughts, or zero-marks) to those presented to view at the indicating-openings. We carry out the printing method of registration by printing the various transactions on a continuous ribbon through the intervention of another ribbon of carbonized paper or other suitably-prepared material placed between it and the type-disk. The carbonized ribbon, after leaving the type-disk and passing between the feed-rollers, is received and wound upon a reel, this reel being rotated by a helical or other suitable spring and fitted with suitable multiplying-gear to give the required number of revolutions to the reel.

In order that our said invention may be particularly described and ascertained, reference is hereby made to the accompanying drawings, in which similar letters of reference indicate corresponding parts.

Figures 1 and 1$^a$ are partial views, which taken together show a front elevation of the machine with the case and portions of the mechanism shown in section. Fig. 1$^t$ is a detail view hereinafter referred to. Figs. 2 and 2$^a$ are also partial views, which taken together show a side elevation of the machine with the casing in section. Fig. 3 is a sectional elevation of a portion of the case and cover, illustrating our method of returning the lever-handles to zero. Fig. 3$^A$ is a plan view of the catch $k$. Fig. 4 is a diagrammatical plan showing the various positions of the lever-handles and the catch for returning the same, also the form of slots in which the handles move. Fig. 5 shows a portion of the drums, on a reduced scale, illustrating the arrangement of figures on the same. Fig. 6 is a side elevation, partly in section, of our warning or signaling apparatus for indicating when the ribbons are broken or exhausted. Fig. 7 is a front elevation of the above warning apparatus. Fig. 8 is an elevation, partly in section, of our brake apparatus for checking the momentum of the parts. Fig. 9 is a face view of the registering dials and pawls. Fig. 10 is an end or side view of the same. Fig. 11 is a front elevation of that side of the machine which is presented to the customer. Fig. 12 is a side elevation of the device shown in Fig. 11.

$a$ is the casing of the machine, the principal portion of which is cylindrical.

$a'$ is a partially-rotating cover. This cover is so arranged that when the operator is setting the figures of the drums $a^2$ $a^3$ $a^4$ $a^5$, Figs. 1 and 1$^a$, to indicate the amount of a transaction to be registered the cover $a'$ is over the figure-openings $a^6$, Figs. 2$^a$ and 11, on that side of the machine which is presented to the view of the customer, and so hides from view those openings and any figure or figures that would otherwise be there displayed. After the operator has set the figures of the indicating-drums $a^2$ $a^3$ $a^4$ $a^5$ to the amount he wishes to display by means of the actuating-lever handles $b$, attached to those drums, he moves the cover $a'$ backward toward himself by means of the handles $a^8$, Figs. 1, 1$^a$, and 12, until the figure-openings $a^6$ on the customer's side are exposed to view and the figure-openings $a^7$, Fig. 2$^a$, on the operator's side covered. The cover $a'$ when in this latter position—that is, when fully drawn back—covers up at the same time all the operating lever handles or pulls $b$ in whatever position they may be placed, and so prevents those lever-handles, and consequently the exposed figures, being for the time moved or interfered with in any way whatever until the cover is moved forward again. This cover is carried by the projecting ends of a spindle $b'$, Figs. 1 and 12, which passes through the center of the hollow spindles $b^2$ $b^3$ $b^4$ $b^5$, Figs. 1 and 10, and which projecting ends of the spindle $b'$ stand beyond the sides of the casing $a$. Upon this spindle $b'$, carrying the cover, is mounted or fixed a toothed sector or pinion $c$, Figs. 1 and 2, which is in gear with and gives motion to a rack-frame $c'$, Figs. 1 and 2, attached to a sliding bar $c^2$, Fig. 1. This bar has upon it a suitably-shaped raised portion $c^3$, Fig. 2, which comes in contact with a roller $c^4$, Figs. 1 and 2, attached to a platen-plunger $c^5$, thereby raising the same and the platen $c^{19}$, Fig. 1, during a certain part of its stroke. The above-mentioned roller $c^4$ of the platen-plunger is pivoted and arranged in such a manner—namely, by being carried by links $c^6$, one of which has a projection $c^7$, which engages with a lever-catch $c^8$, Fig. 2, pivoted to the before-mentioned sliding bar $c^2$—that it can tilt the roller $c^4$ out of the way of its raised portion $c^3$, and thereby prevents the raising of the platen $c^{19}$ on the return-stroke of the bar $c^2$. There is also a pressure roller $c^9$, Figs. 1 and 2, beneath the sliding bar to relieve the strain on the bar when printing. This sliding bar is arranged to impart in a similar manner by the raised portions $c^3$ on the same (through the intervention of a pawl acting on a ratchet-wheel attached to one of a pair of feed-rollers, and through which the ribbons pass) the necessary amount of movement to the ribbons, as well as to ring a bell or alarm, which bell or alarm is sounded each time the machine is opened.

We will proceed more fully to describe these movements with reference to Figs. 1 and 2. The cam projection $c^{10}$ gives motion to the lever $c^{11}$ and pawl $c^{12}$ by means of the connecting-rod $c^{13}$. This connecting-rod $c^{13}$ is pointed to the lever $c^{11}$ and is guided in the fixed bearing $c^{14}$. The lower end of the rod has a roller $c^{15}$ on it, which runs on the cam $c^{10}$, above mentioned, and is kept against the same by the spring $c^{16}$. The ratchet-wheel $c^{17}$ is actuated by the pawl $c^{12}$ and is fixed to the spindle of one of the feed-rollers $d$ and gives the proper motion to the same. This ratchet-wheel $c^{17}$ is provided with a retaining-pawl $c^{18}$. The lower feed-roller $d$ is actuated through the motion of the upper roller by the toothed wheels $d'$, Fig. 1. The pin $e$ on the rack-frame $c'$, Figs. 1 and 2, coming in contact with the tail end $e'$ of the bell-hammer lever $e^2$, Fig. 1, causes the bell $e^3$ to be struck by the hammer $e^4$ when the rack-frame $c'$ is moving in one direction (preferably at or near the end of that stroke which takes place when the cover is being moved backward) and to escape being struck when moving in the contrary direction by the action of the tail end $e'$ of the lever $e^2$, which is rule-jointed and fitted with a spring, as particularly shown in Figs. 1 and 1$^b$.

The apparatus is sometimes provided with a suitable locking arrangement for the purpose of fixing the working parts so as to prevent the machine being unauthoritatively worked, (which will be fully described farther on.) We also, in cases where we register by printing, arrange so that when either of the lengths of ribbon has run out or become broken the machine becomes automatically locked, so that it cannot be further worked, and this mechanism may also be made to sound a bell (or alarm) and actuate a warning-indicator. This locking apparatus consists of a frictional attachment to the two reels on which the ribbons are wound, whereby on either of them being run out or on breaking either of the ribbons a spring is released, and thereby allowed to act so as to shoot a bolt into some part of the mechanism of the machine that has motion, thus locking the machine and preventing its being further used while in that state.

We arrange the mechanism of the above locking apparatus in the following manner, as shown in Figs. 1, 2, 6, and 7. We attach a grooved pulley $f$ to each of the supply-ribbon reels $f'$, so that the two rotate together—namely, each reel and its accompanying grooved pulley. A band or cord $f^2$ is passed partly round the two grooved pulleys, having its ends $f^3$ fixed or attached through the intervention of a spring $f^{22}$ to some convenient part of the framing of the machine, while that portion of the cord lying between the grooved pulleys $f$ is kept taut by a third or intermediate pulley $f^4$, which presses down the cord, so producing between it and those portions of the grooved pulleys with which is in contact a certain amount of friction, but not more friction than the strength of either of the ribbons $f^5$ will bear in their action of rotating the pulleys when being unwound from the same by the motion of the feed-rollers $d$ of the printing mechanism before described. The intermediate pulley $f^4$ is on one end of a bell-crank lever $f^6$, the other end of which lever forms a pawl $f^7$, which is, by means of the pull or drag of the ribbons $f^5$, kept in gear with a ratchet-wheel $f^9$. This ratchet-wheel is fixed on a spindle $f^{10}$, to which is also attached one end of a coiled spring $f^{11}$, Figs. 1 and 2, which is wound up by the action of the ratchet-wheel $f^9$ and pawl $f^7$, the other end of the spring being fastened to the frame $f^{16}$ of the machine. When the pawl $f^7$ is out of gear with the ratchet-wheel $f^9$, which takes place when either of the ribbons is run out or accidentally broken, (for then the spring $f^8$, connected to the bell-crank lever $f^6$, can pull the pawl $f^7$ out of gear, then the spring $f^{11}$, attached to the spindle, rotates the same, and in so doing, by means of a screw $f^{12}$ on the other end of the spindle $f^{10}$, propels, through the intervention of a bell-crank lever $f^{13}$, a bolt $f^{14}$ (provided with a telescopic spring end $f^{15}$) forward into some suitable moving portion of the mechanism, preferably when at its position of rest. In the present case the bolt $f^{14}$, Fig. 1, is shown arranged to shoot into a sector $i$, Figs. 1 and 2, fixed on the drum-spindle $b'$, when the cover arrives at the end of its backward stroke.

The construction of the above-mentioned telescopic end $f^{15}$ is as follows: The internal spring $f^{17}$ is more powerful in its action than the external spring $f^{18}$. The former acts between the telescopic end $f^{15}$ and the bolt $f^{14}$ and the external spring $f^{18}$ between a fixed bearing $f^{19}$ and the collar $f^{20}$ on the telescopic end $f^{15}$. When the internal spring $f^{17}$ is under compression by the ascent of the bolt $f^{14}$, it has sufficient power to drive up the telescopic end $f^{15}$ in opposition to the force exerted by the external spring $f^{18}$ until it shoots into the notch $i'$ or shoots it onto the periphery of the sector $i$, where it remains until by the movement of the sector the notch $i'$ in the same comes into position to receive the telescopic end $f^{15}$. Also, the telescopic end $f^{15}$ is so arranged that the bolt $f^{23}$ of an ordinary lock can, by the incline $f^{24}$ upon it coming against the incline on the collar $f^{20}$, raise the latter (when the bolt of the lock is shot) and so shoot the telescopic end into the notch $i'$ in the manner before described. This latter arrangement is so constructed that it can be modified to be used with the dial registration as well as with the ribbon registration. The alarm-bell $f^{25}$, Fig. 1, is actuated by the nose-piece $f^{26}$ on the nut $f^{27}$ in a similar manner to that in which the bell $e^3$ is actuated. Also, in lieu of the before-mentioned locking-gear we sometimes arrange an arm or tablet to each length of ribbon, to be conspicuously displayed to give notice when either of the ribbons has nearly run out or broken. This arrangement is as follows: We fit upon one end of a rod $g$, Figs. 6 and 7, an indicator $g'$ and on the other end of the same rod (or on a lever $g^4$ in contact with the rod) a projection or arm $g^2$, sometimes fitted with a roller which rests against some portion of the ribbon $f^5$ in tension—namely, some part of the ribbon between the reel $f'$ and the feed-rollers $d$. The rod $g$ is also fitted with a spiral or other form of spring $g^3$, which tends to project the indicator $g'$, but is prevented from so doing by reason of the projection or arm $g^2$ on the rod $g$ (or on the lever $g^4$) being caught or held back by the ribbon. When the ribbon is exhausted from the reels or is broken, the projection or arm $g^2$ being then freed, the rod shoots forward and the warning-indicator $g'$ is thrust forward and displayed through a suitable opening in the machine-casing, within which casing the described signaling arrangement can be located at any convenient point. In lieu of this signal arrangement, a bell or gong $h$ may be sounded, or a combination of both, as shown, may be used.

We sometimes when registering by printing, as before described, arrange the movable cover so that on its return-stroke it picks up all the operating-handles and returns them to their zero position in the same manner as when registering by dials and pointers and the form of the casing being in like manner modified, as hereinafter described.

When, as illustrated in Figs. 9 and 10, we register by dials and pointers, we effect this by attaching to each of the drum-spindles $b^2$ $b^3$ $b^4$ $b^5$ a disk-wheel $m$, carrying a pawl $m'$. This latter engages with a ratchet-wheel $m^2$, suitably divided according to the denomination of the type-disk with which it is connected. This ratchet-wheel is in one with or fixed to a spur-wheel $m^3$, both running loose on the spindle. The spur-wheel $m^3$ is connected by wheel-work $m^4$ to pointers $n$ on a dial $n'$ and is provided with a retaining-pawl $m^5$. The wheel-work is suitably ratioed according to the units or tens of the denomination with which it is connected. As each transaction is indicated or shown it is at the same time recorded by the hands or pointers $n$, above described, shown upon one or more dials $n'$. On the face of each dial $n'$ a suitable stop $o$ is formed for the purpose of facilitating the hands or pointers $n$ being set or adjusted to zero. The stop $o$ allows the hands to travel over it when moving in the direction of registering, but catches or stops the hands when turned back to zero.

Suitable brake or retaining apparatus is applied, when necessary, to the spindles and wheels to check recoil. This we preferably construct as follows: On the part to be checked—say, for example, a type-wheel $b^6$—we insert in the side of the same a pin $v$, Fig. 8, which, on the wheel approaching its position of rest, comes into contact with one arm $v'$ of a bell-crank lever $v^2$, which is pivoted to a carriage $v^3$, attached to some part of the framing of the machine. This arm $v'$ has more or less spring in it, and the pin $v$, pressing against the same, propels the brake-surface of the other arm $v^4$ of the bell-crank lever $v^2$ firmly against a portion of the surface of the type-wheel. We also in this pointer and dial arrangement of registration arrange the cover on its forward movement to pick up automatically all the actuating-handles and carry them to their respective zero or blank-space positions. As this requires more movement of the cover than when the lever-handles are not returned to zero, we modify the principal portion of the case to an entire cylinder to allow for the increased motion of the cover.

The manner in which the before-mentioned handles are in each case automatically picked up is as follows: We place beneath the cover $a'$ in a suitable position out of the control of the operator a spring-catch $k$, Figs. 3 and $3^a$, which is so constructed as to pass over its handle $b$ on the cover being moved backward toward the operator, but to catch or carry the handle with it to its zero position on the forward movement of the cover from the operator. In this forward movement when the handle $b$ arrives at its zero position—namely, in the position shown in Fig. 3—it is, as before explained, left there, and the cover $a'$ continues to travel until the knob of the handle is exposed, so that it can be manipulated by the operator for the next transaction. This automatic return of the handles of the drums to zero by the movable cover $a'$ is performed in the following manner, (which it will be understood is the same in the case of all the four handles and the four catches:) The catch $k$ in the cover has one side $k'$ inclined, so that on coming in contact with another inclined side $l$ of a slot in the knob of the drum-handle when the latter is in the position laterally with regard to the slot, as shown at A, Fig. 4, it pushes the latter laterally until it is brought against the other or unnotched side $l'$ of the slot $l^2$, as shown at B, Fig. 4, in the case $a$. It then continues to carry the handle forward until the handle reaches its zero position, as shown at C. Here the unnotched side of the slot is recessed, as shown at $l^3$, so that the handle is, by means of the incline of the catch, moved still farther sidewise until the catch has driven the handle laterally out of the path of the catch, as shown at C, so that the cover can pass on, leaving the handle at the zero position. Sometimes we modify the mechanism of the movement before mentioned in so far that we raise and so free the catch on the handle arriving at or near its zero position by means of a pin of suitable form fixed in the case, which, coming in contact with a projection on the arm of the spring-catch, raises the latter and so allows the case to pass on, leaving the handle behind.

We place a screen $a^9$, Figs. $2^a$, 11, and 12, on the top of the machine clear of the sliding cover $a'$, on the customer's side of which instructions are given as to the method of utilizing the machine. This screen acts as a stop to the forward movement of the cover.

In applications of even date herewith, Serial Nos. 326,815 and 326,817, we have shown, described, and claimed in the first-named case the combination, in a cash-register, of indicating, registering, and printing devices and their operating mechanisms, and in the last above-named case the combination, in a cash-register, of a series of oscillating tablets, means for concealing certain tablets, levers for operating said tablets, a series of key-levers, a series of pawls each adapted to hold a tablet in its exposed position and to release it when a key is actuated, mechanism connected with and operated by the key-levers to tilt said pawls and release the tablets, and printing mechanism operated by the key-levers, and we would have it understood that we do not claim such in this application.

What we herein claim as our invention is—

1. In a cash-register, the combination, with a series of drums or cylinders concentrically mounted on independent shafts or sleeves and adapted to indicate an amount, and levers connected therewith and projecting through slots in the casing for operating said drums, of a movable case or cover adapted to conceal the handles when the amount is exposed and conceal the amount when the handles are exposed, substantially as described.

2. In a cash-register, the combination, with the indicating-drums, type-wheels connected therewith so as to present corresponding amounts, levers for adjusting the same, and printing mechanism for recording the amounts, of a case or cover adapted to cover the figure-openings while the drums are being set and which automatically operates the printing mechanism as it is rotated to expose the figure-openings, substantially as described.

3. In a cash-register, the combination, with an indicating and recording mechanism and a carbonized and receiving ribbon adapted to record the amounts, of a bolt adapted to be propelled to engage with and check the recording mechanism upon the running out or breaking of either of said ribbons, substantially as described.

4. In a cash-register, the combination, with indicating and recording mechanism, levers to adjust the same, and a case or cover that always covers either the figure-openings or the levers, of a series of catches $k$, adapted to engage with and return the levers to their normal position as the cover is turned to expose said levers for operation, substantially as described.

FREDERICK ALFRED MESSER.
WALTER FULLER THORPE.

Witnesses:
GEORGE C. DOWNING,
8 *Quality Court, London, W. C.*
T. F. BARNES,
17 *Gracechurch Street, London.*